Patented Oct. 30, 1934

1,978,777

UNITED STATES PATENT OFFICE 1,978,777

SULPHONE-MORPHOLINE COMPOUNDS OF THE AMINO-ANTHRAQUINONE SERIES

Karl Zahn, Frankfort-on-the-Main-Hochst, and Willi Gädke, Hofheim-on-the-Taunus, Germany, assignors to General Aniline Works, Inc., New York, N. Y., a corporation of Delaware No Drawing. Application December 15, 1933, Serial No. 702,644. In Germany December 17, 1932

5 Claims. (Cl. 260—27)

Our present invention relates to new sulfur- and nitrogen-containing derivatives of the anthraquinone series; more particularly it relates to new compounds of the general formula:

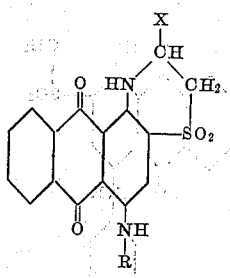

where X stands for hydrogen or methyl and R represents a radical of the benzene, naphthalene or diphenyl series.

Our new products are obtainable by causing a compound of the general formula:

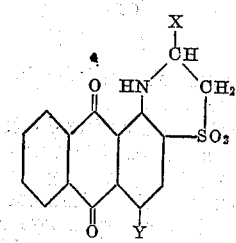

wherein X stands for hydrogen or methyl and Y for a chlorine or bromine atom, to react with a primary amine of the benzene, naphthalene or diphenyl series. The reaction is carried out in a suitable solvent or diluent, preferably in the presence of an acid binding agent, such as an alkali metal acetate, and, if desired, in the presence of a small quantity of a catalytically acting substance such as copper or a copper compound.

The above defined starting materials are obtainable by treating thiomorpholine compounds of the anthraquinone series having the general formula:

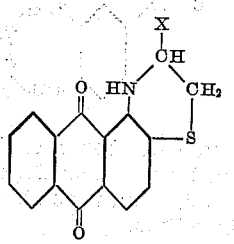

wherein X stands for hydrogen or methyl which compounds are, for instance, disclosed in German Patent No. 462,799, with a suitable oxidizing agent, such as hydrogen peroxide, and introducing a halogen atom into the resulting compounds by means of a chlorinating or brominating agent, so far as the starting material should not already contain an exchangeable halogen atom.

The new condensation products are valuable compounds of deep color. So far as these products are not yet per se dyestuffs, they yield, on sulphonation, water-soluble dyestuffs dyeing the animal fiber clear tints of good fastness properties.

The following examples illustrate the invention, but they are not intended to limit it thereto; the parts are by weight unless otherwise stated:

(1) 80 parts of the anthraquinone derivative of the following probable constitution:

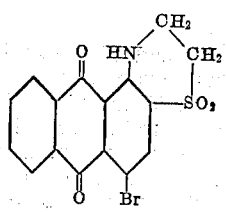

are kept gently boiling with 800 parts of aniline and 23 parts of anhydrous sodium acetate, for 8 hours, while stirring. The somewhat cooled melt is then introduced into alcohol, while stirring, and the reaction product is isolated in the usual manner. It forms, when recrystallized from chlorobenzene, greenish dark-blue laminæ melting at 256° C. to 257° C. and has the following constitution:

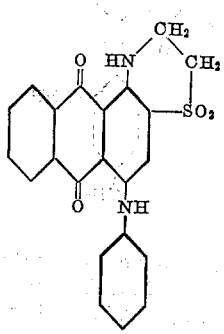

The anthraquinone derivative used as starting material melts at 256° C. to 258° C. It is obtainable by oxidizing the anthraquinone-1.2-dihydro-para-thioazine melting at 171° C. to 172° C. described in Example 1 of U. S. patent specification No. 1,709,986, by means of hydrogen peroxide in a solution of glacial acetic acid and then brominating in nitrobenzene the oxidation product which constitutes brown brilliant laminæ melting at 291° C. to 292° C.

The dyestuff base made according to the first paragraph of this example may also be obtained by using as starting material, instead of the bromine derivative, the corresponding chlorine derivative.

20 parts of the dyestuff base are introduced, while stirring, into a mixture of 160 parts of sulphuric acid monohydrate and 100 parts of fuming sulphuric acid containing 20 per cent. of sulphuric anhydride, and stirring is continued until a sample taken is completely soluble in water. By pouring the mixture into water and adding sodium chloride, a dyestuff is precipitated in the form of a dark-blue powder which dyes wool from an acid bath clear blue tints of good fastness properties. The dyestuff corresponds to the following formula:

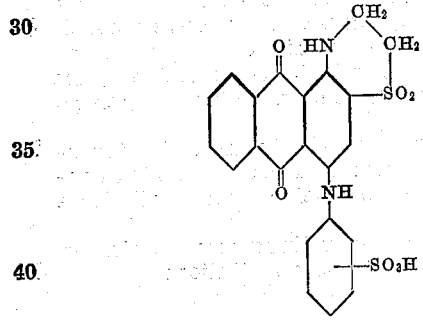

(2) By using instead of the aniline indicated in the preceding example the corresponding quantity of para-toluidine and heating for several hours to a temperature between 190° C. and 195° C., a reaction product is obtained which crystallizes from chlorobenzene in the form of long dark blue needles melting at 227° C. to 228° C. By sulphonation a dyestuff is obtained which dyes wool clear greenish-blue tints and has the following constitution:

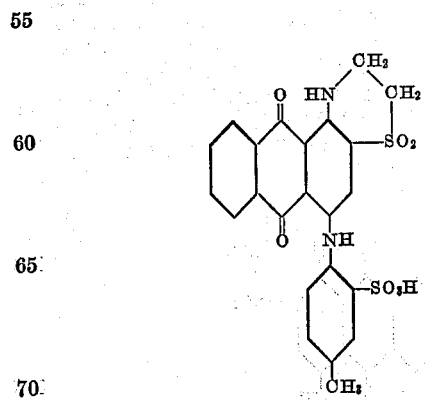

(3) By causing the starting material described in Example 1 to react in a similar manner with 4-aminodiphenyl, a dyestuff base is obtained in the form of green needles melting at 275° C. to 276° C. This compound corresponds to the formula:

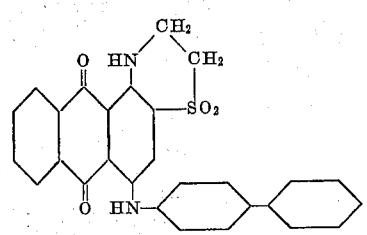

By sulphonating it a dyestuff is obtained which dyes wool fast green tints.

(4) The starting material used in Example 1 is heated with para-cyclohexylaniline for about 2 hours to 200° C. The product is worked up in known manner. A dyestuff base is obtained in the form of dark blue crystals melting at 232° C. to 233° C. It corresponds to the following formula:

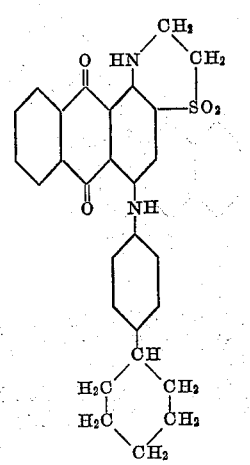

The sulphonic acid obtainable therefrom dyes wool greenish blue tints.

(5) 12 parts of the starting material used in Example 1, 10 parts of 2-amino-5.6.7.8-tetrahydronaphthalene, 100 parts by volume of iso-amylalcohol, 5 parts of potassium acetate and 0.12 part of copper acetate are kept gently boiling for 1½ hours, while stirring. Methanol is introduced at about 60° C., while stirring, whereupon the dyestuff base is isolated in the usual manner. It has the following formula:

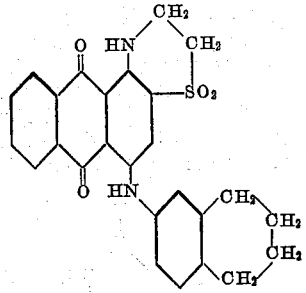

When redissolved from benzene, it forms dark green crystals melting at 222° C. to 223° C. By sulphonating it a dyestuff is obtained which dyes wool greenish blue tints.

(6) 50 parts of the anthraquinone derivative of the following probable constitution:

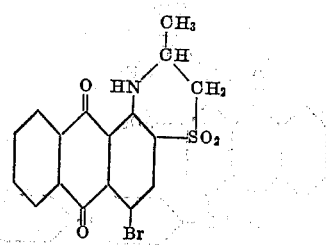

melting at a temperature above 300° C., are caused to react in the usual manner with para-toluidine and anhydrous sodium acetate. A dyestuff is obtained which crystallizes from chlorobenzene in the form of reddish dark-blue needles, melting at 287° C. to 288° C. The sulphonic acid made therefrom dyes wool blue tints. The dyestuff has the following constitution:

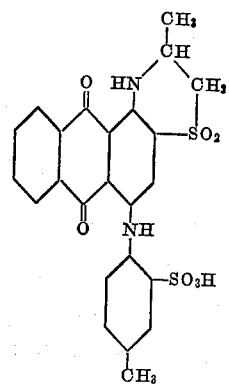

The anthraquinone derivative used as starting material is obtainable by causing monochloroacetone to react with the sodium salt of 1-amino-2-mercapto-anthraquinone and boiling the thus formed condensation product in chlorobenzene while adding glacial acetic acid whereby ring closure takes place according to the following probable equation:

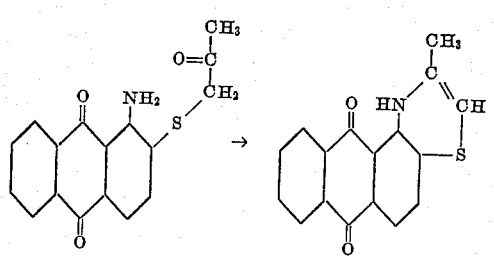

The product obtained is hydrogenated and the resulting compound melting at 229° C. to 230° C., of the formula:

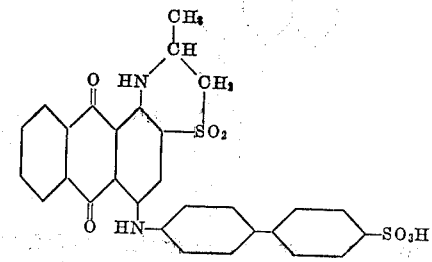

is oxidized by means of hydrogen peroxide in a solution of glacial acetic acid and then brominated in nitrobenzene.

(7) The starting material used in Example 6 is heated in a suitable manner with 4-aminodiphenyl for a short time to about 250° C. and the product is worked up as usual. A color base is obtained which crystallizes in the form of dark violet needles melting at a temperature above 300° C. The sulphonic acid made therefrom dyes wool greenish blue tints. The sulphonated compound has the following constitution:

We claim:

1. The compounds of the general formula:

wherein X stands for hydrogen or methyl and R represents a radical of the benzene, naphthalene or diphenyl series.

2. The compounds of the general formula:

wherein X stands for hydrogen or methyl and R represents a radical of the benzene, naphthalene or diphenyl series which compounds are soluble in water and dye the animal fiber from an acid bath.

3. The compound of the formula:

being soluble in water and dyeing wool from an acid bath greenish blue tints, the corresponding unsulphonated compound having a melting point of 227° C. to 228° C.

4. The compound of the formula:
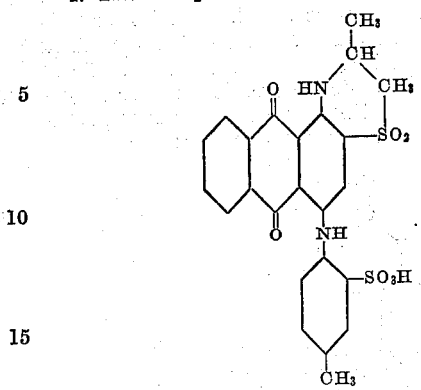
being soluble in water and dyeing wool from an acid bath blue tints, the corresponding unsulphonated compound having a melting point of 287° C. to 288° C.
5. The compound of the formula:
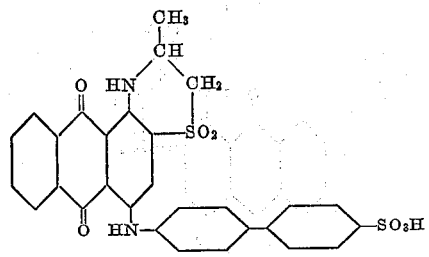
being soluble in water and dyeing wool from an acid bath greenish blue tints, the unsulphonated compound having a melting point of above 300° C.
KARL ZAHN.
WILLI GÄDKE.